Patented Jan. 3, 1933

1,892,768

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

OXIDATION OF FLUORENE

No Drawing.   Application filed October 31, 1928. Serial No. 316,364.

This invention relates to the catalytic, vapor-phase oxidation of fluorene substances.

It has been proposed to oxidize fluorene catalytically in the vapor phase in the presence of metal oxide catalysts. This process has never been of commercial value as the yields are low and the product is of poor quality and difficult to purify. In my co-pending applications, Serial No. 310,438, filed October 4, 1928, and Serial No. 310,679, filed October 5, 1928, I have described the oxidation of fluorene substances by means of more effective contact masses, such as those containing salts of catalytically active acids and those containing stabilizers or stabilizer promoters. Stabilizers are compounds of metals falling within the group consisting of alkali metals, alkaline earth metals and earth metals whose oxides are not reducible with hydrogen; these compounds being so termed because they have a marked stabilizing or smoothing effect on the action of the catalyst.

According to the present invention, fluorene, its homologues and dehydrogenation products, such is bisdiphenylene-ethylene or bisdiphenylene-ethane (difluorenyl) or substituted fluorenes such as halogen substituted fluorenes, may be oxidized to the corresponding fluorenones, catalytically in the vapor phase in the presence of steam. Steam appears to smooth out the reaction and to permit obtaining better yields and purer products. The present invention is not limited to the use of steam with the highly effective contact masses described in my co-pending applications above referred to but also includes processes in which metal oxide catalysts are used. While the latter are not as effective, the advantages of the present invention greatly improve yields and quality of the product even when metal oxide catalysts are used and it is an advantage of the present invention that it is not only applicable to processes using highly effective contact masses but may also be used with success in processes in which the relatively less effective metal oxide contact masses are employed.

The amount of steam which may be used can be varied within extremely wide limits although for any particular contact mass there is usually an optimum range. The process of the present invention may be carried out under the same temperatures and general reaction conditions, such as concentration of reacting material and the like, which are suitable with the type of catalyst used. It should be noted, however, that where large amounts of steam are used the smoothing out and slowing up of the reaction permits in many cases employing higher temperatures and this is sometimes of advantage with certain contact masses and it is always an advantage of the present invention that the process is less sensitive to fluctuations in reaction temperature than where steam is not employed. The steam, therefore, makes it unnecessary to use quite as accurate a temperature control and at the same time its high specific heat enhances the temperature control of the reaction as a whole.

The process of the present invention may be carried out using air as an oxidizing gas or other oxidizing gases such as mixtures of carbon dioxide and oxygen may be used.

The invention will be described in greater detail in connection with the following specific examples which illustrate a few typical embodiments of the invention without, however, limiting its scope to the precise details therein set forth.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

Example 1

8–12 mesh quartz fragments are boiled in caustic potash until they are no longer transparent and their surfaces are thoroughly etched. The caustic potash is then washed off, first with water and then with dilute hydrochloric acid. The etched fragments are then placed in a revolving container and heated to a temperature well above the boiling point of water, and sprayed with an ammonium vanadate solution. The temperature of the fragments should be sufficiently high so that the water in the ammonium vanadate solution is evaporated immediately on striking the fragments, which are constantly tumbled by the revolving of the container. In this manner a uniform coating of ammonium vanadate is obtained on the fragments. The coated fragments are then placed in a tubular converter and calcined with air at about 400° C., transforming the ammonium vanadate into vanadium pentoxide. After calcination, fluorene is uniformly vaporized into a stream containing air and steam, for example in the proportion of 1 part fluorene to 35 parts of air-steam mixture by weight, and the vapors are passed over the contact mass at 380–420° C. Good yields of fluorenone of excellent purity are obtained.

Instead of using fluorene, its dehydrogenation products, such as bisdiphenylene-ethylene or difluorenyl may be used and a good quality of fluorenone is obtained.

Example 2

18.2 parts of $V_2O_5$ are dissolved in 250 parts of a potassium hydroxide solution containing 22.6 parts of KOH. 27 parts of ferric sulfate are dissolved in 300 parts of water at 50–60° C. and the potassium vanadate solution is poured into the hot solution with vigorous agitation. The yellow precipitate of ferric vanadate which is obtained is filtered by suction, washed with water until the wash water is colorless and then the wet cake is sludged in 200 parts of water and the suspension coated uniformly onto 500 volumes of 8–12 mesh pumice fragments by spraying the suspension onto the carrier material which is agitated, for example in a revolving spray pay, and heated to a sufficiently high temperature so that the water of the suspension is vaporized immediately on striking the carrier material. The contact mass thus obtained is filled into a converter and blown with air at 350–400° C. and is then ready for use.

Fluorene of various grades of purity, for example 80–85%, is uniformly vaporized in an air stream in the ratio of 1:30 by weight and passed over the contact mass at 360–400° C. Good yields of fluorenone of excellent purity are obtained. The temperature of reaction should be accurately controlled and it is advantageous although by no means essential that the reaction be carried out in tubular converters with small catalyst tubes, for example 3/4" internal diameter and 9–12" catalyst depth, surrounded by a temperature regulating bath. This bath may advantageously be mercury or preferably a mercury alloy which boils at the desired temperature. Mercury may be used alone but in such a case it is necessary to cause it to boil under pressure which renders it less satisfactory than alloy baths and also greatly increases the expense. Examples of mercury alloys are alloys of mercury and cadmium, or mercury and lead. An alloy of the latter containing 30 parts of mercury to 70 parts of lead is very satisfactory.

Instead of using a ferric pyrovanadate contact mass as described above, other iron salts of vanadic acid or complex compounds of vanadic acid and iron may be used. Part or all of the vanadic acid may also be replaced by one or more of the acids of the metal elements of the fifth and sixth groups of the periodic system, such as molybdenum, tungsten, uranium, chromium, tantalum or columbium. Some of these contact masses produce small amounts of phthalic anhydride and maleic acid in addition to fluorenone and these impurities may be easily separated and if present in sufficient amount can be recovered and utilized. When a contact mass is used or the reaction conditions are such that phthalic anhydride and maleic acid are obtained, it is particularly desirable to use steam because in the presence of steam the phthalic anhydride is transformed into phthalic acid at about 191° C., which compound is non-volatile. It is thus possible, by careful cooling of the exhaust gases when steam is used, to remove practically all of the phthalic anhydride and in some cases maleic acid.

Instead of iron salts of metal acids of the fifth and sixth groups of the periodic system, other salts may be substituted partly or wholly, such as those of copper, nickel, cobalt, silver, aluminum, titanium, zirconium, manganese or cerium.

The pumice fragments may, of course, be replaced by other carriers such as roughened quartz fragments, fragments of quartz filter stones, sand stones, "Celite" bricks, natural or artificial silicates, base exchange bodies, especially zeolites prepared either by fusion or wet methods and in the latter case preferably diluted with materials rich in silica, metal granules such as aluminum granules or granules of metal alloys such as ferrosilicon, ferrovanadium, and the like.

Instead of oxidizing fluorene, halogen substituted fluorene may be oxidized under the same reaction conditions, the products of course being halogen substituted fluorenone.

Example 3

300 parts of $V_2O_5$ are intimately mixed with about 94 parts of silver nitrate and melted. The melt is permitted to cool and during cooling puffs up to form the porous vanadyl vanadate with evolution of large quantities of oxygen. The puffed product is then broken into pea sized fragments and is ready for use. If desired, diluents such as kieselguhr may be incorporated into the melt in order to produce a diluted silver vanadyl vanadate contact mass.

80% fluorene is uniformly vaporized with air and steam in the proportion of 1 : 30 : 10 by weight and passed over the silver vanadyl vanadate contact mass at 370–390° C. Good yields of fluorenone of high purity are obtained. The silver vanadyl vanadate may be replaced partly or wholly with corresponding amounts of sodium, potassium, lithium, rubidium, or cæsium vanadyl vanadates. The desirable ratios of $V_2O_5$ to the basic oxides for the different vanadyl vanadates are as follows:

$V_2O_5$ to $Na_2O$ as 6 : 1
$V_2O_5$ to $K_2O$ as 5 : 1
$V_2O_5$ to $Li_2O$ as 2 : 1
$V_2O_5$ to $Rb_2O$ as 5 : 1
$V_2O_5$ to $Cs_2O$ as 5 : 1

*Example 4*

18.2 parts of $V_2O_5$ are dissolved in 250 parts of potassium hydroxide solution containing 22.6 parts of KOH. 27 parts of ferric sulfate are dissolved in 300 parts of water at 50–60° C., and the potassium vanadate solution is then poured in with vigorous agitation. The yellow precipitate of ferric pyrovanadate which is obtained is filtered with suction, washed with water until the wash water is colorless, and then the wet cake is sludged with 200 parts of water, to which suspension 35 parts of $K_2SO_4$ dissolved in 250 parts of water are added. The suspension is then coated uniformly onto 500 volumes of 8–12 mesh pumice fragments by spraying the suspension onto the agitated carrier material, for example in a revolving spray pan, the material being maintained at a temperature sufficiently high so that the water of the suspension is immediately vaporized on striking the carrier fragments.

The potassium sulfate acts as a stabilizer in the contact mass, and may be replaced partly or wholly by one or more other compounds of the alkali or alkaline earth metal groups, such as for example potassium nitrate, potassium bisulfate, potassium chloride, potassium bromide, calcium sulfate, manganese sulfate, or the corresponding compounds of lithium, sodium, rubidium, cæsium, etc.

The amounts of stabilizers used may be varied within wide limits, and will depend to some extent on the stabilizers selected.

The contact mass is filled into the converter, which may preferably be a tubular converter having small tubes, for example an inner diameter of ¾" and a contact mass depth of 6–12", surrounded by a temperature regulating bath, for example a boiling bath. The bath may be mercury which is permitted to boil under the necessary pressure; or mercury alloy baths may be used which boil under atmospheric pressure at the desired temperature. The alloy baths are cheaper than mercury, and require no complicated pressure devices, and are, therefore, preferable. Examples of alloys are mercury-cadmium alloys or mercury-lead alloys, especially an alloy containing about 30 parts of mercury to 70 parts of lead.

Fluorene is uniformly vaporized into an air stream containing steam in the ratio of 1 : 25 by weight and passed over the contact mass at 380–420° C., giving yields of fluorenone of high purity up to 80% of the theory. When steam is used fluorenone of extremely high purity may be obtained at about 400° C. The vanadium in the contact mass may be partly or wholly replaced by other elements, such as the other metal elements of the fifth and sixth groups of the periodic system, for example molybdenum, tungsten, uranium, chromium, columbium and tantalum. Instead of iron salts, salts of cobalt, nickel, copper, silver, aluminum, titanium, zirconium, or cerium may be used, singly or in admixture.

The pumice fragment carriers may be replaced with other carrier material, such as for example roughened fragments of quartz, quartz filter stones, sand stones, "Celite" bricks, fragments of natural or artificial silicates, base exchange bodies such as zeolites, especially those prepared by fusion methods, metal granules such as those of aluminum or metal alloys such as ferrosilicon, ferrovanadium and the like.

*Example 5*

1,000 parts of a natural base exchange body or a diluted or undiluted artificial base exchange body made by wet or fusion methods are treated with 5–10% metal salt solutions such as ferric sulfate, cobalt nitrate, nickel sulfate, copper sulfate, silver nitrate, aluminum sulfate, manganese sulfate, vanadyl sulfate, chromium nitrate, singly or in admixture, in order to exchange a maximum of the exchangeable alkali. The treatment may take place by trickling the solutions over the base exchange body at 40–50° C. After base exchange has been completed the products are treated with water soluble compounds of the metal acids of the fifth and sixth groups of the periodic system, such as a solution of ammonium vanadate or ammonium molybdate, in order to form with the base exchange bodies the so-called salt-like bodies. These derivatives are then calcined with 7% $SO_2$ gases or gases containing a corresponding amount of $SO_3$ at 400–500° C.

Fluorene is uniformly vaporized with air and steam in various ratios, such as for example 1 : 35 by weight, and is passed over the contact mass at 370–420° C. Good yields of fluorenone of high purity are obtained. The reaction conditions, such as the temperature, time of contact, loading of the catalyst, proportion of fluorene to oxidizing gases used, etc., may be varied within wide limits.

In addition to these variations oxygen containing diluent gases such as carbon dioxide and nitrogen may be present. The steam is especially advantageous, particularly where the fluorenone is accompanied by impurities such as phthalic anhydride and maleic acid. The use of steam not only smooths out the reaction conditions and permits higher loadings, but the acid products, particularly phthalic anhydride, can be readily separated in the presence of steam. Thus, for example, it is only necessary to cool the reacted gases down to a temperature below 191° C. in the presence of steam to transform the phthalic anhydride into the non-volatile phthalic acid which separates out from the gas stream.

The oxidation of fluorene with the above contact mass can be carried out in tubular bath converters as described in connection with Example 4, or it may be carried out in converters provided with reaction gas cooling, which increases its cooling effect in direct proportion with the amount of reaction gases passing through, the so-called automatic heat exchange converters. The exotherm can be effectively controlled with or without recirculation of reacted products, and good yields of fluorenone can be obtained.

Example 6

200 parts of 33° Bé. potassium waterglass solution diluted with 600–800 parts of water are mixed with sufficient kieselguhr or "Celite" brick refuse until the solution just remains easily stirrable. 18 parts of $V_2O_5$ are reduced by means of sulfur dioxide in a hot aqueous solution acidified with sulfuric acid, blue vanadyl sulfate being produced which is then transformed into a brown solution of potassium vanadite by treatment with sufficient 10 N. caustic potash solution. A 5–10% solution of a mixture of ferrous sulfate and manganese sulfate in the ratio of 3:1 is prepared. The waterglass suspension and the vanadite solution are mixed together and the ferrous-manganese sulfate solution is then added in a thin stream with vigorous agitation until the reaction mixture becomes neutral to phenolphthalein or just alkaline. The mass solidifies to a dirty greenish gel, which is filtered with suction, washed three times with 100 volumes of water and dried, constituting a diluted multi-component ziolite which contains tetravalent vanadium, iron and manganese in non-exchangeable form.

Instead of suspending the diluent in the waterglass it may be suspended in the potassium vanadite solution, or the vanadite and waterglass solutions may be mixed and the diluent then added. The vanadite solution may also be replaced partly or wholly by corresponding amounts of a potassium vanadate solution, which may be obtained by directly dissolving $V_2O_5$ in 2 N. caustic potash. This solution may also be partly or wholly replaced by other metallates of the fifth and sixth groups of the periodic system, such as potassium tungstate.

Instead of using a mixture of ferrous and manganese sulfates other metal salt solutions, such as, for example, solutions containing one or more salts of copper, nickel, cobalt, iron or aluminum, may be used.

After drying the zeolite may be transformed by base exchange or by the formation of salt-like bodies as described in the foregoing example. If base exchange is to be effected it is desirable to first hydrate the zeolite by trickling water over it. Among the elements which may be introduced by base exchange are iron, cobalt, silver, nickel and cerium, which introduction can be effected by trickling 5–10% solutions of salts of these elements repeatedly over the zeolite at room or somewhat elevated temperatures.

The zeolites described above are alkaline in character and may be used as such, or they may be treated with acid solutions in order to render them neutral or acid in character. This may be effected by spraying fragments of the zeolite with 10% sulfuric or nitric acid in an amount such that a sample of the leached zeolite when boiled with water no longer shows an alkaline reaction.

The contact masses as described above are filled into suitable converters, and fluorene of various grades of purity, uniformly vaporized with air and steam in the ratio of from 1:20 to 1:30, is passed over the contact mass at 370–400° C. Good yields of fluorenone of high purity are obtained, and the impurities of the crude fluorene are entirely burned out or are transformed into compounds of acid character, for example phthalic anhydride or maleic acid, which can be readily separated from the fluorenone since these acid impurities are soluble in water or alkaline solutions whereas fluorenone is practically insoluble.

Instead of using fluorene its dehydrogenation products, such as bisdiphenyleneethylene or difluorenyl, may be employed. Good yields of fluorenone are obtained. Halogen substituted fluorene substances may also be similarly oxidized, resulting in the corresponding fluorenones.

Instead of neutralizing the alkalinity of the zeolite contact masses by means of relatively strong mineral acid solutions as described in the forepart of the example, they may be leached with very dilute acid solutions, for example, the zeolite may be placed on a nutsch filter and treated with ½ to 1½% solutions of the mineral acids such as hydrochloric or sulfuric acid, or, weak acids such as acetic acid may be used. A greater or less amount of exchangeable alkali is leached out, depending on the length of the treatment.

Contact masses prepared in this manner may be used as described above with excellent results.

Example 7

The following mixtures are prepared:

(1) 22 parts of aluminum sulfate with 18 mols of water are dissolved in 100 parts of water, and aluminum hydroxide is precipitated out with ammonia water. The precipitate is then washed with 150–200 parts of water.

(2) 12 parts of $V_2O_5$ are dissolved in 5 N. KOH solution containing 24 parts of KOH, the solution being effected at 80–90° C.

(3) 60 parts of "Celite" brick refuse are suspended in 250 parts of water, and a solution containing 8 parts of ferric sulfate is added and ferric hydroxide is precipitated in the diluent by means of ½ N. KOH. The cake obtained is carefully washed free from the mother liquor. The aluminum hydroxide and potassium vanadate are mixed together to form a milky paste, which is then intimately kneaded with the impregnated "Celite" brick refuse and the product is then thoroughly mixed with 25 parts of 33° Bé. potassium waterglass. Thereupon the material is placed on a suction filter and washed with 100 parts of water, whereupon the cake is dried, preferably at temperatures below 100° C., and broken into small fragments. The granular material is impregnated with a 10% sulfuric acid solution in installments, the product being dried between each impregnation. A so-called salt-like body of the base exchange body is obtained, and is filled into a converter.

80% crude fluorene is uniformly vaporized into an air stream containing steam in the ratio of 1:25 and passed over the contact mass as 370–450° C. Fluorenone is produced, together with some phthalic anhydride and maleic acid, which can be readily separated by well known methods.

Example 8

15 parts of $V_2O_5$ are dissolved with a potassium hydroxide solution containing 200 parts of water to form potassium vanadate. 9.5 parts of sodium tungstate are dissolved in 35 parts of water, and are then mixed with the potassium vanadate and an amount of hydrochloric acid added such that the solution remains distinctly alkaline. The solution is then diluted with 600–700 parts of water, and 70–75 parts of a commercial waterglass solution diluted with an equal amount of water are added with vigorous agitation, the mixture being heated to 60–70° C. Thereupon dilute hydrochloric acid is added in small portions from time to time, care being taken that the reaction mixture remains distinctly alkaline. A gelatinous precipitate is obtained, which is pressed free from the mother liquor, dried and hydrated with water. The hydrated base exchange body is treated by trickling a 5% manganese chloride solution over it until a maximum of the exchangeable alkali is replaced by manganese oxide. The contact mass is then ready for use, and is filled into a converter.

Fluorene vapors, steam and oxidizing gases are passed over the contact mass at 350–500° C., the higher temperatures being used where the oxygen content of the oxidizing gases is kept low and the lower reaction temperatures being used when the oxygen content of the oxidizing gases is low. Good yields of fluorenone are obtained.

Example 9

18 parts of $V_2O_5$ are suspended in 200 parts of water acidulated with concentrated sulfuric acid, and are then reduced in a known manner to vanadyl sulfate, for example, by means of sulfur dioxide. The solution is boiled and concentrated to 150 volumes and divided into two portions in the ratio of 1:2. ⅓ of the vanadyl sulfate is treated with 10 N. potassium hydroxide solution to transform it into the coffee brown vanadite, and it is then mixed with a potassium aluminate solution prepared by dissolving 10 parts of aluminum oxide in the form of the freshly precipitated hydroxide in a 5 N. potassium solution. 100 parts of infusorial earth is thoroughly mixed with the potassium aluminate and potassium vanadite mixture, and thereupon the remaining ⅔ of the vanadyl sulfate solution is added with vigorous agitation. A precipitate is obtained which is pressed, dried, broken into fragments, and then, after hydration for a considerable period of time with water, is digested with a 5% copper sulfate solution, resulting in substituting part of the exchangeable alkali of the non-silicious base exchange body by copper. Thereupon the product is broken into fragments, calcined with 3–4% burner gases at 450° C., and is then ready for use.

90% fluorene is uniformly vaporized into an air stream containing steam in the ratio of 1:25 and passed over the contact mass at 360–400° C. A fluorenone of high purity is obtained.

Example 10

21.5 parts of ferric chloride are dissolved in 300 parts of water and 80 parts of infusorial earth are stirred in. The suspension is then heated to 40–50° C., and a potassium vanadate solution containing 18.1 parts of $V_2O_5$ and 22.6 parts of KOH in 250 parts of water is added with vigorous agitation. The infusorial earth is uniformly impregnated with ferric vanadate, and is separated from the mother liquor by filtration and washed with 250 parts of cold water. 90.5 parts of 33° Bé. waterglass are diluted with 4–5 volumes of water and mixed with the impregnated infusorial earth with vigorous agitation in order to effect a uniform distribution. 60 parts of aluminum sulfate with 18 mols of water are dissolved in 200 parts of water, and a 10 N. potassium hydroxide solution is added to dissolve the aluminum hydroxide which is at first precipitated. The potassium aluminate solution thus formed is stirred into the suspension, and the mixture heated up to about 60° C. A gelatinous precipitate is obtained almost immediately, and is increased by the addition of 2 N. sulfuric acid. Care should be taken, however, that a weak alkalinity to phenolphthalein is retained. The stirring is continued for an hour, the mixture being gradually permitted to cool down to room temperature, and the gelatinous precipitate obtained is pressed, washed with 200 parts of water in small portions, dried at about 80° C., and broken into yellow fragments of suitable size which are filled into a converter where they may be subjected to a preliminary treatment with 4–6% burner gases at 450–500° C., followed by blowing with air.

Instead of using iron vanadate as the diluent in the zeolite, other catalytically active salts of acids of vanadium or other metals of the fifth and sixth groups of the periodic system may be used. Such salts are, for example, those of nickel, cobalt, manganese, copper, aluminum, titanium, silver, barium and calcium.

If desired the contact mass above described, in which the zeolite is diluted with a catalytically active diluent, may be coated or affixed to massive carrier fragments of natural or artificial origin, such as, for example, materials rich in $SiO_2$, for instance roughened fragments of quartz, flint, pumice, quartz filter stones, or artificial carriers such as, for example, tablets prepared from kieselguhr and waterglass, kieselguhr and potassium aluminate, kieselguhr and alkalies or alkali metal salts, and the like. Metal alloy carrier fragments may also be used, such as, for example, aluminum granules or roughened granules of ferrovanadium, ferromolybdenum, ferrosilicon, silicon ferromanganese, silicon aluminum ferromanganese, ferrotitanium, ferrotungsten and the like. These coated contact masses may be prepared by causing the waterglass-impregnated-infusorial earth suspension to adhere to the carrier and then forming the zeolite in situ by adding the aluminate solution or by spraying with an aluminum sulfate solution, in which case a zeolite of the aluminum double silicate type is formed.

A further class of very effective contact masses is obtained by leaching the zeolite above described with dilute acids to remove part or all of the exchangeable alkali. This may be effected by trickling ½ to 1% acid solutions over the zeolites, the extent of leaching being determined by the duration of treatment. After leaching the contact masses should be dried before using. Fluorene of various grades of purity is vaporized into an air stream containing steam in the ratio of 1:20 and passed over the contact mass as described above at 340–450° C., fluorenone of excellent purity being obtained.

What is claimed as new is:

1. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones.

2. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones, the contact mass containing at least one metal element of the fifth and sixth groups of the periodic system.

3. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones the contact mass containing vanadium.

4. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a stabilized contact mass which favors the oxidation of fluorene substances to fluorenones.

5. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a stabilized vanadium-containing contact mass which favors the oxidation of fluorene substances to fluorenones.

6. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones the contact mass containing at least one permutogenetic body.

7. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones, the contact mass containing at least one diluted permutogenetic body.

8. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones, the contact mass containing at least one permutogenetic body in which at least one metal element of the fifth or sixth group of the periodic system is present.

9. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones, the contact mass containing at least one permutogenetic body in which at least one metal element of the fifth or sixth group of the periodic system is present in non-exchangeable form.

10. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones, the contact mass containing at least one permutogenetic body in which vanadium is present.

11. A method of oxidizing fluorene substances to fluorenones, which comprises vaporizing the substances, admixing the vapors with an oxidizing gas and large amounts of steam in addition to that normally present and passing the mixture at reaction temperatures between 350 and 500° C. over a contact mass which favors the oxidation of fluorene substances to fluorenones, the contact mass containing at least one permutogenetic body in which vanadium is present in non-exchangeable form.

12. A method of oxidizing fluorene substances to fluorenones, which comprises vaporizing the fluorene substances, admixing the vapors with an oxidizing gas and large amounts of steam in addition to the normally present, passing the mixture at reaction temperatures between 350 and 500° C. over a contact mass which favors the oxidation of fluorene substances to fluorenones and which also favors the production of polycarboxylic acid impurities and subjecting the exhaust gases to a temperature somewhat below that at which at least part of the polycarboxylic acid impurities are transformed into non-volatile compounds in the presence of steam.

13. A method of oxidizing fluorene substances to fluorenones, which comprises vaporizing the fluorene substances, admixing the vapors with an oxidizing gas and large amounts of steam in addition to that normally present, passing the mixture at reaction temperatures between 350 and 500° C. over a contact mass which favors the oxidation of fluorene substances to fluorenones and which also favors the production of phthalic anhydride and subjecting the exhaust gases to a temperature slightly below 191° C.

14. A method of oxidizing fluorene substances to fluorenones, which comprises vaporizing the fluorene substances, admixing the vapors with an oxidizing gas and large amounts of steam in addition to that normally present, passing the mixture at reaction temperatures between 350 and 500° C. over a contact mass containing a stabilizer which favors the oxidation of fluorene substances to fluorenones and which also favors the production of polycarboxylic acid impurities and subjecting the exhaust gases to a temperature somewhat below that at which at least part of the polycarboxylic acid impurities are transformed into non-volatile compounds in the presence of steam.

15. A method of oxidizing fluorene substances to fluorenone, which comprises vaporizing the fluorene substances, admixing the vapors with an oxidizing gas and large amounts of steam in addition to that normally present, passing the mixture at reaction temperatures between 350 and 500° C. over a contact mass containing a stabilizer which favors the oxidation of fluorene substances to fluorenone and which also favors the production of phthalic anhydride and subjecting the exhaust gases to a temperature slightly below 191° C.

16. A method of oxidizing fluorene substances to fluorenones, which comprises vaporizing the fluorene substances, admixing the vapors with a oxidizing gas and large amounts of steam in addition to that normally present, passing the mixture at reaction temperatures between 350 and 500° C. over a contact mass containing at least one permutogenetic body which favors the oxidation of fluorene substances to fluorenones and which also favor the production of polycarboxylic acid impurities and subjecting the exhaust gases to a temperature somewhat below that at which at least part of the polycarboxylic acid impurities are transformed into non-volatile compounds in the presence of steam.

17. A method of oxidizing fluorene substances to fluorenones, which comprises vaporizing the fluorene substances, admixing the vapors with an oxidizing gas and large amounts of steam in addition to that normally present, passing the mixture at reaction temperatures between 350 and 500° C. over a contact mass containing at least one permutogenetic body which favors the oxidation of fluorene substances to fluorenones and which also favors the production of phthalic anhydride and subjecting the exhaust gases to a temperature slightly below 191° C.

Signed at Pittsburgh, Pennsylvania, this 30th day of October, 1928.

ALPHONS O. JAEGER.